(12) United States Patent
Klein

(10) Patent No.: US 7,577,397 B2
(45) Date of Patent: Aug. 18, 2009

(54) SYSTEM AND METHOD FOR REDUCING DATA LOSS OVER RADIO FREQUENCIES TO ROVING DIGITAL RECEIVERS

(75) Inventor: Paul Fredric Klein, Newbury Park, CA (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 11/259,918

(22) Filed: Oct. 27, 2005

(65) Prior Publication Data

US 2007/0118666 A1    May 24, 2007

(51) Int. Cl.
H04H 1/00 (2006.01)
(52) U.S. Cl. .................. 455/3.02; 455/3.04; 455/3.06; 709/231
(58) Field of Classification Search ............... 455/3.02, 455/3.03, 3.04, 3.06, 414.1, 414.4, 425, 456.2, 455/9, 10, 13.2, 504, 514; 709/230, 231
See application file for complete search history.

(56) References Cited

U.S. PATENT DOCUMENTS

| | | | |
|---|---|---|---|
| 5,818,829 A | 10/1998 | Raith et al. ................. | 370/347 |
| 6,084,865 A | 7/2000 | Dent ........................... | 370/321 |
| 6,373,430 B1 | 4/2002 | Beason et al. .......... | 342/357.09 |
| 6,614,767 B1 | 9/2003 | Marko et al. ................ | 370/321 |
| 6,625,129 B1 | 9/2003 | Olds et al. ................... | 370/316 |
| 2004/0022231 A1 | 2/2004 | Morrish et al. .............. | 370/349 |
| 2004/0116069 A1 | 6/2004 | Fadavi-Ardekani et al. | 455/3.02 |
| 2004/0116070 A1 | 6/2004 | Fishman et al. ............. | 455/3.01 |
| 2004/0192189 A1 | 9/2004 | Yuhara et al. ............... | 455/3.02 |
| 2004/0218618 A1 | 11/2004 | Asami ......................... | 370/432 |
| 2007/0010192 A1* | 1/2007 | Kawamata et al. .......... | 455/3.02 |
| 2007/0022208 A1* | 1/2007 | Hashimoto et al. .......... | 709/231 |
| 2007/0106811 A1* | 5/2007 | Ryman ........................ | 709/230 |

* cited by examiner

*Primary Examiner*—Tan Trinh
(74) *Attorney, Agent, or Firm*—VanLeeuwen & VanLeeuwen; Christine H. Smith

(57) ABSTRACT

Transmitting streaming media data in overlapping bursts can reduce data loss when transmitting over radio frequencies to a roving digital receiver. A digital transmitter transmits streaming media information in bursts, where each burst of data preferably contains several seconds of streaming media information. The streaming media information to be transmitted is grouped into transmission bursts, or packets, each transmission burst containing several units of media content, or content units. A content unit is an amount of content that is stored and played by a digital receiver. Each burst contains a certain amount of information, such as a certain number of content units, which are the same as some of those sent in the previous burst. Each burst also contains new content units, i.e. content units that have not previously been transmitted. Transmitting overlapping bursts of information allows a roving receiver to temporarily lose contact with the transmitter, and yet minimizes the loss of data from the receiver's perspective. The overlapping nature of the packets makes it more likely that a roving receiver will receive all, or most, of the content units needed to continue playing the media presentation without "dead space" or static.

20 Claims, 6 Drawing Sheets

SYSTEM AND METHOD FOR REDUCING DATA LOSS OVER RADIO FREQUENCIES TO ROVING DIGITAL RECEIVERS

BACKGROUND OF THE INVENTION

1. Technical Field

The present invention relates in general to a system and method for streaming digital communications. In particular, the present invention relates to a system and method for reducing data loss when streaming digital media information over radio frequencies to a moving receiver.

2. Description of the Related Art

A sender transmitting a stream of digital media data via radio frequency transmitters can not be sure that the streaming media is actually received by a digital radio frequency receiver unless that receiver is also a transmitter, capable of sending an acknowledgement. An example of a receiver with this acknowledgement capability is a cell phone. However, many digital receivers do not have this acknowledgement capability, and therefore the sender is never sure that the media was actually received. Further, many digital receivers are portable and can be easily moved. These receivers can rove in and out of reception areas, frequently causing the transmitted signal to be sometimes available and sometimes not available.

An example of a commercial digital receiver that can be adversely affected by not having a continuous transmitted signal in its reception path is a satellite radio receiver. The digital radio frequency transmitter in a satellite radio system is typically a satellite, or satellites, with an antenna stationed approximately 23,000 miles overhead. The receiver in a satellite radio system is often in an automobile, or other mobile device, which is continuously moving during receiver operation. The roving receiver is constantly going under bridges, through tunnels, or into areas where a temporary loss of signal is unavoidable. This results in an annoying loss of radio reception that occurs periodically throughout the listening day.

What is needed, therefore, is a system and method that reduces the loss of digital information when streaming digital data is sent to a roving digital receiver.

SUMMARY

It has been discovered that transmitting streaming media data in overlapping bursts can reduce data loss when transmitting to a moving receiver. A digital transmitter transmits streaming media information in bursts, where each burst of data preferably contains several seconds of streaming media information. The streaming media information to be transmitted is grouped into transmission bursts, or packets, each transmission burst containing several units of media content, or content units. A content unit is an amount of content that is stored and played by a digital receiver. Each burst contains a certain amount of information, such as a certain number of content units, which are the same as some of those sent in the previous burst. Each burst also contains new content units, i.e. content units that have not previously been transmitted. For example, packet one may contain content units one through ten, packet two may contain content units four through thirteen, packet three may contain content units seven through sixteen, and so on.

Transmitting overlapping bursts of information allows a roving receiver to temporarily lose contact with the transmitter, and yet minimizes the loss of data from the receiver's perspective. The overlapping nature of the packets makes it more likely that a roving receiver will receive all, or most, of the content units needed to continue playing the media presentation without "dead space" or static. This is particularly useful when the roving receiver is likely to temporarily lose the transmission signal, for example, when an automobile goes through a tunnel.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention is a method, system, and computer program product that reduces data loss when streaming digital information over radio frequencies to a roving digital receiver that experiences a temporary loss of reception. A digital transmitter transmits streaming media information in bursts. Each burst of data preferably contains several seconds of streaming media information, and is typically sent to a receiver in a fraction of a second. The information to be transmitted is loaded into a content buffer and grouped into transmission bursts. Each transmission burst contains several units of media content, or content units. A content unit is an amount of content, such as a second, or a few seconds, of content, that is stored and played by a digital receiver. As the receiver's application processes a burst of transmitted information, the next burst of information is queued at the transmitter, and, preferably within seconds, it too is transmitted. Each burst contains a certain amount of information, such as a certain number of content units, which are the same as some of those sent in the previous burst. Each burst also contains new content units, i.e. content units that have not previously been transmitted.

Transmitting overlapping bursts of information allows a roving receiver to temporarily lose contact with the transmitter, and yet minimizes the loss of data from the receiver's perspective. Thus, an automobile with a satellite radio receiver may drive through a tunnel for several seconds without experiencing any interruption in a radio broadcast being listened to by the driver of the automobile.

The present invention may be used with any type of streaming digital data, including multimedia information such as music, talk shows, movies, etc. Any type of digital transmitter, such as a satellite, repeater, or ground transmission station may be used to transmit digital streaming information to many different types of roving receivers, including, but not limited to automobiles, radios, personal computers, personal digital assistants, cell phones, etc.

Figure 1:
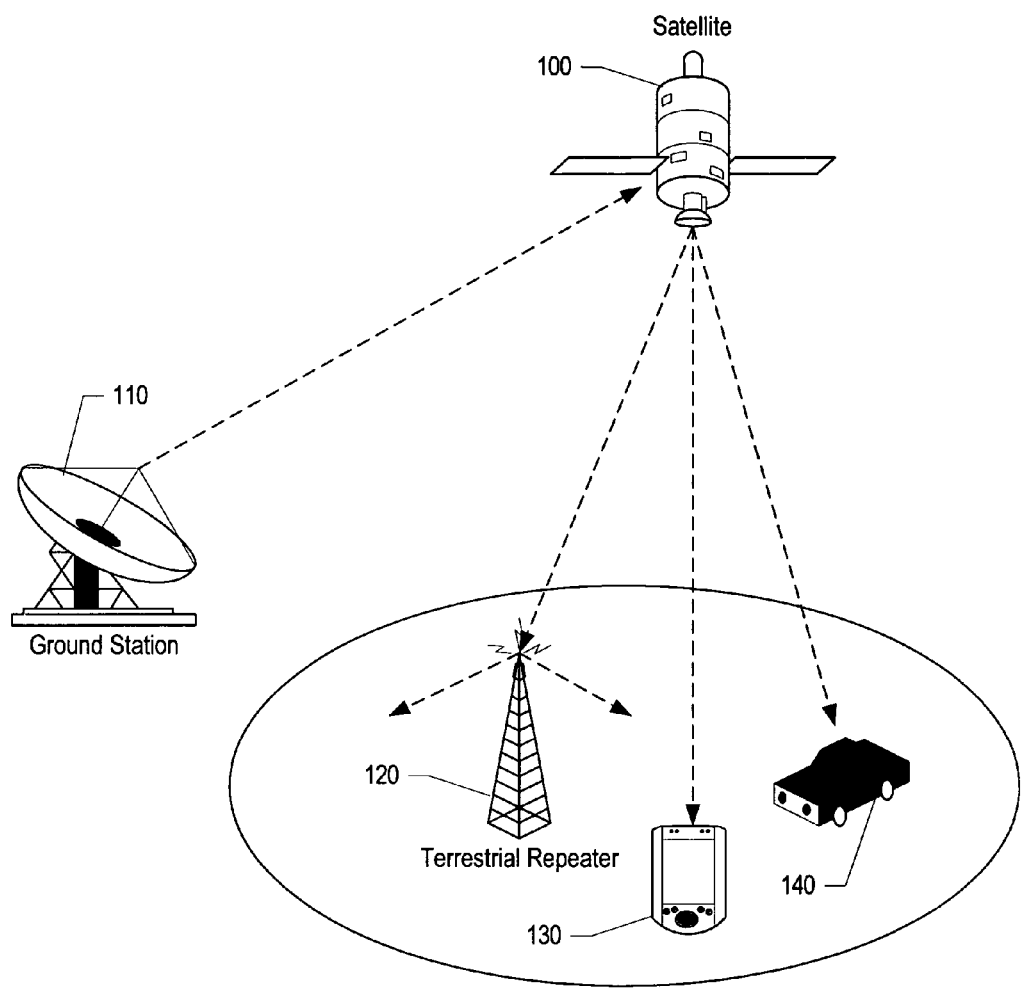
FIG. 1 is a high-level diagram of a satellite radio system, depicting digital streaming media information being transmitted to roving receivers.

FIG. 1 is a high-level diagram of a satellite radio system, depicting digital streaming media information being transmitted to roving receivers. Satellite 100 receives digital media information from ground station 110. Ground station 110 may be a radio station or other type of multi-media outlet. As an example, ground station 110 may send music to satellite 100 for broadcast to satellite radio subscribers. As described in detail in FIG. 2, satellite 100 transmits overlapping bursts, or packets, of streaming media information over a radio frequency to roving receivers located in, for example, PDA 130 or automobile 140. Satellite 100 may also transmit the overlapping bursts to terrestrial repeater 120, for further transmission from terrestrial repeater 120 to roving receivers, such as PDA 130 or automobile 140. The streaming digital information may be prepared for transmission as overlapping bursts, or packets, by ground station 110 or by satellite 100.

Figure 2:
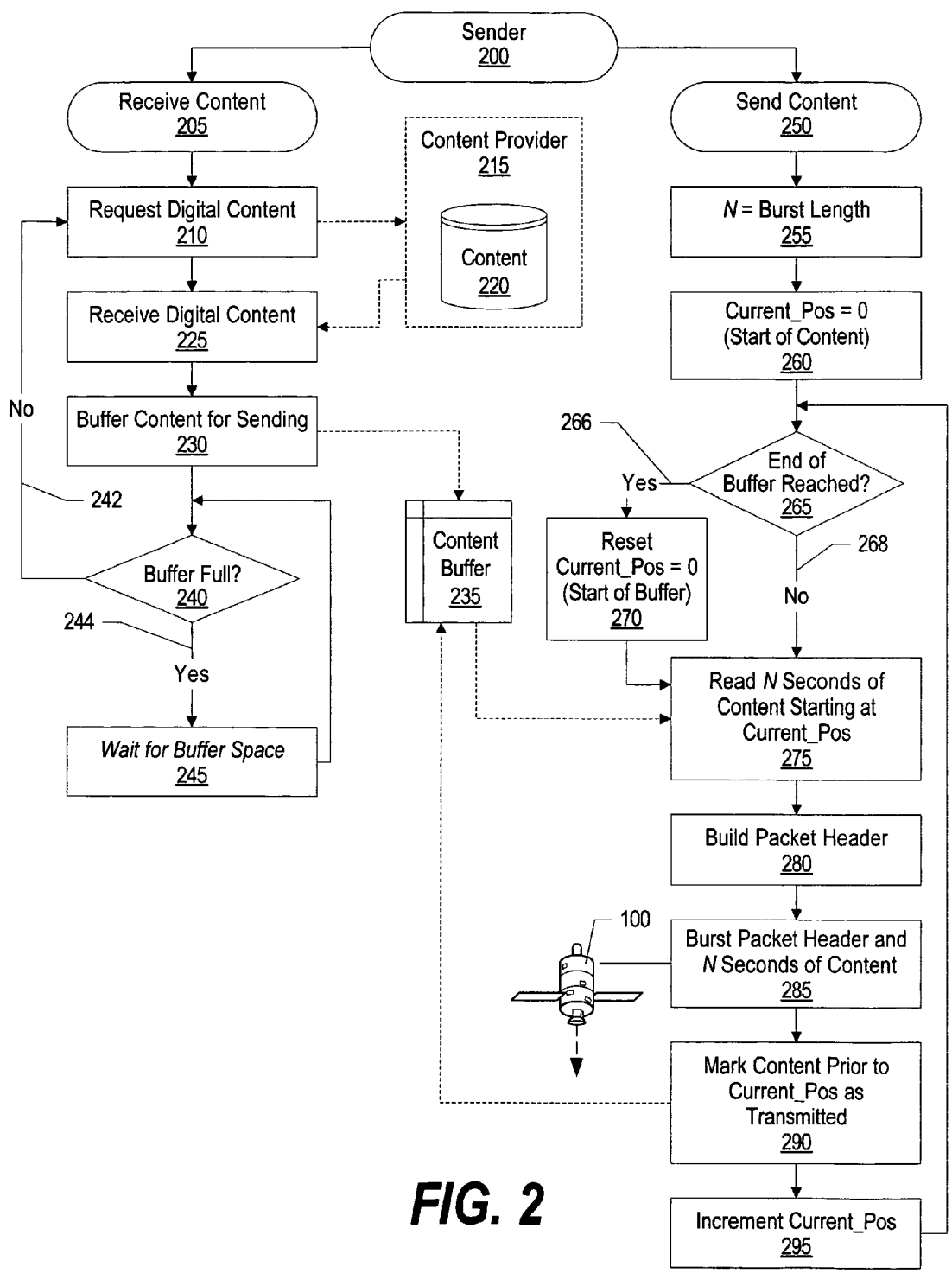
FIG. 2 is a flow chart depicting a sender transmitting packets of streaming digital information to a receiver.

FIG. 2 is a flow chart depicting a sender transmitting packets of streaming digital information to a receiver. The process begins at 200 whereupon a sender receives content (process 205) by requesting digital content (step 210) from content provider 215. Content provider 215 may be any entity that provides multimedia content 220. For example, content provider 215 may be a radio station or other type of music provider that provides songs, or other radio programs, as content 220. Content provider 215 may also be a movie studio or movie distributor that provides movies as content 220.

The sender receives digital content 220 from content provider 215 (step 225), and then buffers the content for sending (step 230). The digital streaming media content that is to be sent to the receiver is buffered in content buffer 235. A determination is made as to whether content buffer 235 is full (decision 240). If content buffer 235 is full, decision 240 branches to "yes" branch 244, whereupon the application waits for buffer space (step 245). If, however, content buffer 235 is not full, decision 240 branches to "no" branch 242, whereupon processing returns to step 210 to request additional digital content.

The sender also sends content to a receiver. This process begins at 250, whereupon a burst length of "N" is defined (step 255). "N" is the number of content units that will go into each packet, or burst, of information. In this particular example, each content unit is one second long, and so "N" is the number of seconds of data that will be put into each packet that is burst to the receiver. The current position in the content buffer is set to zero, i.e. to the start of the content buffer (step 260). A determination is made as to whether the end of the content buffer has been reached (decision 265). If the end of the content buffer has been reached, then decision 265 branches to "yes" branch 266, whereupon the current position in content buffer 235 is reset to the start of the buffer. If, however, the end of content buffer 235 has not been reached, decision 265 branches to "no" branch 268, whereupon "N" seconds of data are read from content buffer 235, starting at the current position (step 275). As discussed above, in this particular example, each content unit is one second long. However, those skilled in the art will understand that a content unit may be any number of seconds, or even a fraction of a second in length. Those skilled in the art will further understand that a packet may consist of any number of content units. Each packet preferably contains the same number of content units, however, it would be possible to implement the invention using packets with varying numbers of content units.

A packet header is built (step 280), including information relating to the number, duration, and time sequence of the content units included in the packet. For example, the header may indicate that the packet includes ten content units, each content unit is one second in duration, and the first content unit begins 180 seconds into a particular song. The sender, such as satellite 100, then bursts the packet, including the packet header and "N" content units, to the receiver (step 285). The content that has been sent is marked as transmitted in content buffer 235 (step 290), and the current position in content buffer 235 is incremented (step 295). Processing then continues at decision 265.

Figure 3:
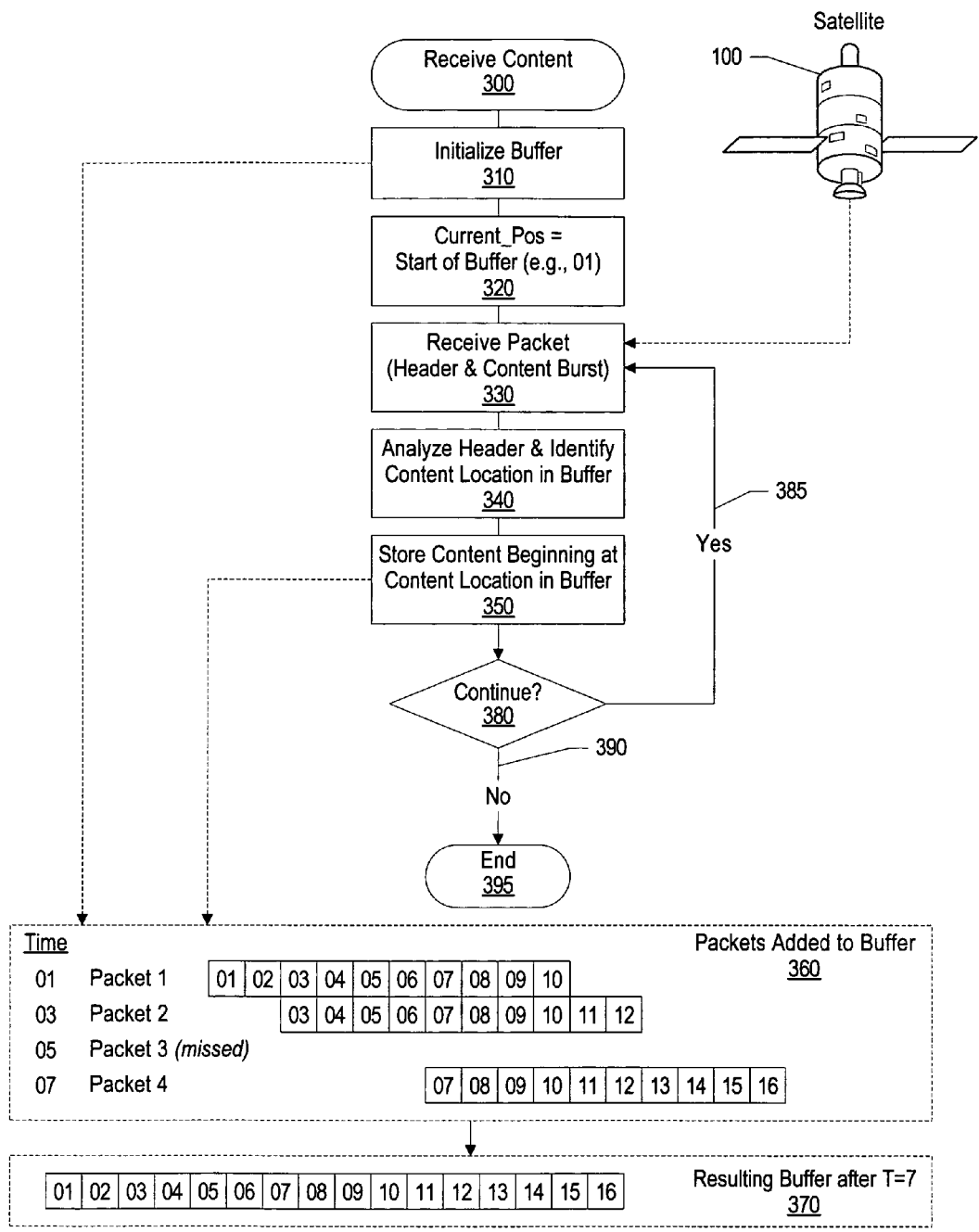
FIG. 3 is a flow chart depicting a receiver receiving packets of streaming digital information from a sender.

FIG. 3 is a flow chart depicting a receiver receiving packets of streaming digital information from a sender. Processing begins at 300, whereupon the receiver initializes a buffer for use in receiving the overlapping packets that are burst to the receiver (step 310). Note that depiction 360 shows packets as they are being added to a play buffer, and depiction 370 shows the resulting play buffer after several packets have been received. The receiver sets a current position pointer to the start of the buffer (step 320), and then receives a packet, including a header and content units (step 330). In the example shown, the packet is received from satellite 100, however, the packet may also be received by a terrestrial repeater and then further transmitted to a receiver, such as an automobile satellite radio receiver.

The receiver analyzes the header in order to determine the number and duration of the content units contained in the packet, and also to determine which content units are in the packet, i.e. where the content units are located within the current transmission (step 340). The content units are stored at the current content location within the buffer (step 350). A determination is made as to whether to continue processing (decision 380). If it is determined to continue, decision 380 branches to "yes" branch 385, whereupon processing continues at step 330. If, however, it is not determined to continue (for example, the listener may have changed stations or turned the radio off), decision 380 branches to "no" branch 390, whereupon processing ends at 395.

As shown in depiction 360, as packets are received from satellite 100, the receiver overlays each packet in the play buffer. In the example shown in FIG. 3, Packet 1 is inserted in the play buffer, followed by Packet 2. Note that Packet 2 contains some of the same content units as Packet 1, i.e. content units 03 through 10. However, Packet 2 also contains two new content units, i.e. content units 11 and 12. Packet 3 is missed, perhaps because the receiver temporarily lost the satellite signal. Packet 4 is received, however, and contains content units 07 through 16. When the receiver overlays the received packets in the play buffer, all necessary content units are present in the buffer, as depicted in 370.

An alternate method for storing packets in the play buffer is for the receiver to analyze each packet as it is received, and determine which content units have not previously been stored in the play buffer. The receiver then stores only the new content units, i.e. those content units that have not previously been stored, in the play buffer. The new content units are stored after the content units that have been previously stored in the play buffer.

Figure 4:
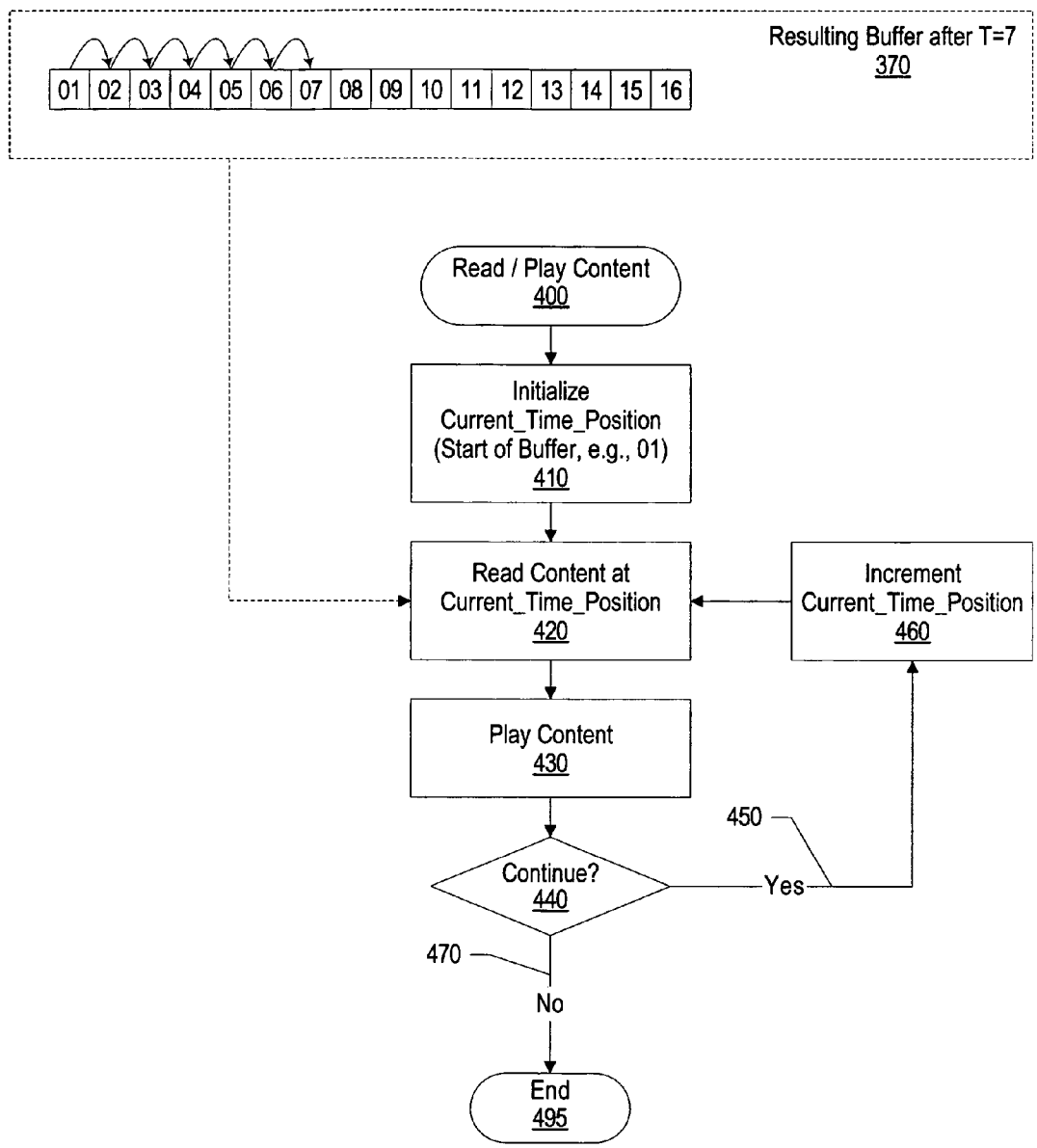
FIG. 4 is a flowchart depicting a receiver reading and/or playing the digital streaming information packets received from a sender.

FIG. 4 is a flowchart depicting a receiver reading and/or playing the digital streaming information packets received from a sender. Processing begins at 400, whereupon the player (or receiver/player) initializes a current time position to the start of a play buffer (step 410). For example, the current time position may be set to the first second of play buffer 370. The player reads the content at the current time position (step 420) and then plays the content (step 430). A decision is made regarding whether or not to continue (decision 440). If the decision is to continue, decision 440 branches to "yes" branch 450, whereupon the current time position is incremented (step 460). If the decision is not made to continue (for example, perhaps the listener has changed stations or turned off the radio), decision 440 branches to "no" branch 470, whereupon processing ends at 495.

Figure 5:
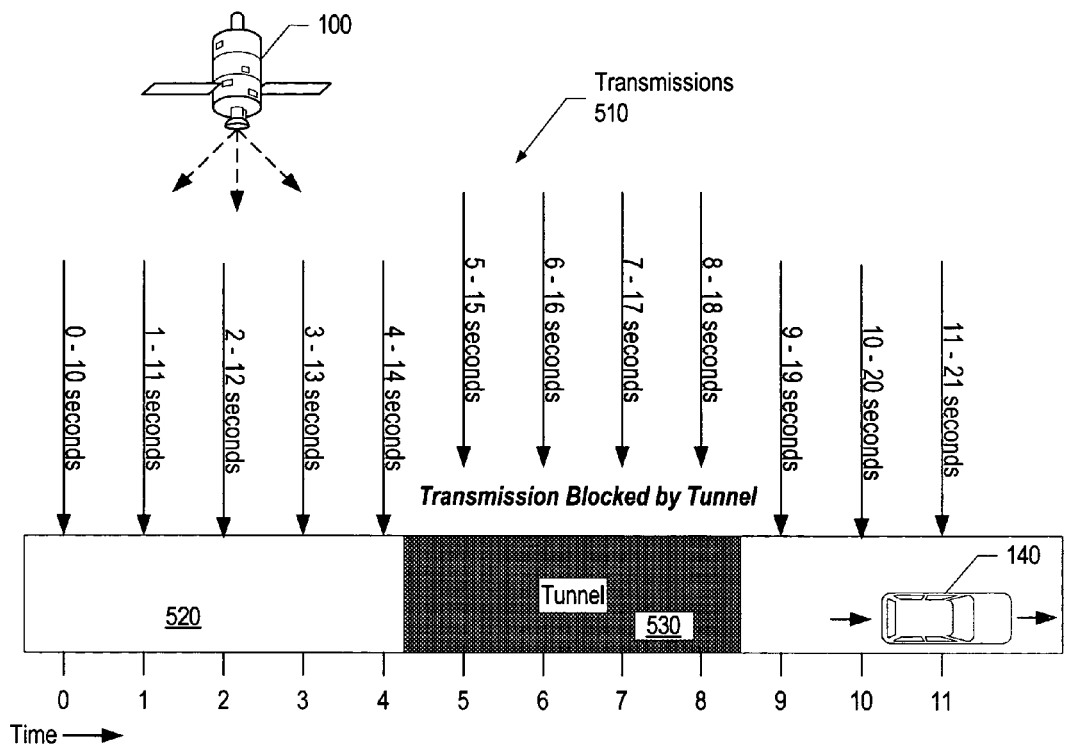
FIG. 5 is an example of a roving digital receiver losing reception for several seconds, and thus receiving some packets of streaming digital information, while not receiving others.

FIG. 5 is an example of a roving digital receiver losing reception for several seconds, and thus receiving some packets of streaming digital information, while not receiving others. In the example depicted in FIG. 5, the roving digital receiver is located in automobile 140, which is traveling along road 520. A listener in automobile 140 listens to a transmission from satellite 100. Satellite 100 transmits streaming media information, in this case radio information, such as a radio show or music, over a radio frequency that the listener has selected. Note that more than one satellite may actually be broadcasting transmissions for the selected frequency. Also, as discussed above, satellite 100 may transmit to a terrestrial repeater which then further transmits to automobile 140.

As automobile 140 travels down road 520, it receives packets of overlapping media content, transmitted in bursts from satellite 100. In the example depicted in FIG. 5, each burst is ten seconds long, i.e. each packet contains ten content units of one second each. After receiving five packets of streaming digital information from satellite 100, automobile 140 enters tunnel 530, and thus does not receive the next four packets of streaming digital information. After emerging from tunnel 530, the moving receiver located in automobile 140 again continues to receive packets.

Buffer 550 depicts the resulting play buffer as the packets are received. Note that as shown by reference numeral 560, several packets (in this example, the sixth through ninth packets) were not received. Without the overlapping method of the present invention, the listener would hear only static while traveling through tunnel 530. However, due to the overlapping nature of the packets that were received according to the present invention, no actual data is lost. Because many of the content units are found in more than one packet, every content unit necessary to play the media content without interruption has been received. Every second of digital streaming media has been received, and will be played by the receiver located in automobile 140. Those skilled in the art will understand that if tunnel 530 is sufficiently long enough, it would be possible to lose some data, i.e. some content units may not be received. However, the data loss would be minimal compared to prior art methods that do not use the overlapping packet bursts of the present invention.

Figure 6:
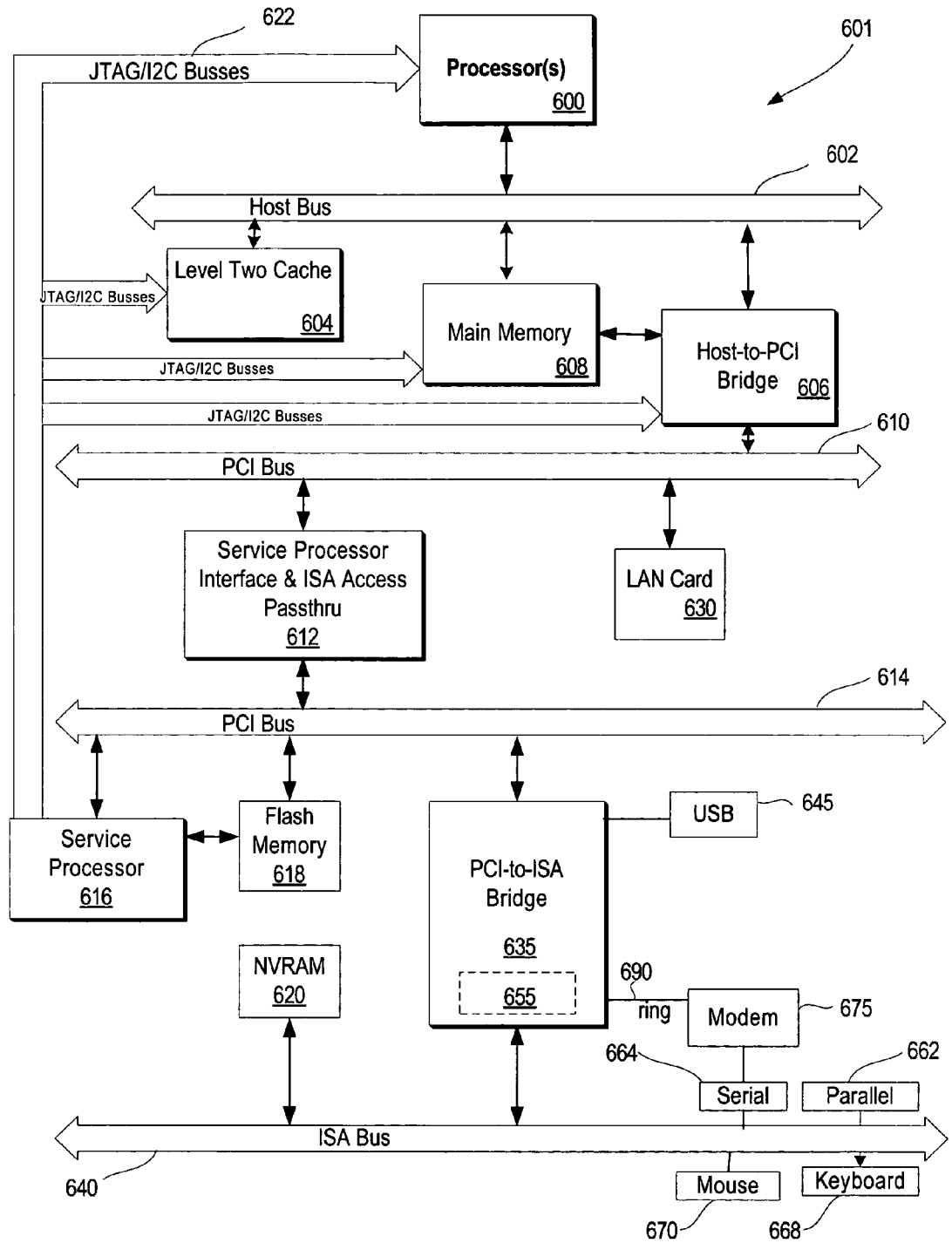
FIG. 6 is a block diagram of a computing device capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for receiving streaming digital information at a moving receiver, said method comprising:
   receiving a first packet of streaming digital content corresponding to a first time interval of the streaming digital content, wherein the first packet includes a first plurality of content units;
   storing the first packet in a play buffer;
   receiving a second packet of streaming digital content corresponding to a second time interval of the streaming digital content, wherein the second packet includes a second plurality of content units, and wherein one or more of the second content units are the same as one or more of the first content units, and wherein one or more of the second content units are not the same as any of the first content units;
   storing one or more of the second content units in the play buffer;
   sequentially reading the content units stored in the play buffer; and
   playing the sequentially read content units on a media output device.

2. The method of claim 1 wherein storing the one or more second content units in the play buffer further comprises:
   overlaying one or more of the first content units that are the same as one or more of the second content units.

3. The method of claim 1 wherein storing the one or more second content units in the play buffer further comprises:
   selecting the second content units that are not the same as any of the first content units; and
   storing the selected second content units in the play buffer.

4. The method of claim 3 wherein storing the selected second content units in the play buffer comprises storing the selected second content units in a position after the first packet stored in the play buffer.

5. The method of claim 1 further comprising:
   receiving a third packet of streaming digital content corresponding to a third time interval of the streaming digital content, wherein the third packet includes a third plurality of content units, and wherein one or more of the third content units are the same as one or more of the second content units, and wherein one or more of the third content units are not the same as any of the second content units; and
   storing one or more of the third content units in the play buffer.

6. The method of claim 1 further comprising:
   after receiving the first packet, encountering an obstruction that prevents reception of one or more subsequent packets; and
   wherein receiving the second packet occurs after encountering the obstruction, and wherein the playing occurs without an interruption.

7. The method of claim 1, wherein the media output device is a digital radio.

8. An information handling system comprising:
   one or more processors;
   a nonvolatile storage device accessible by the processors; and
   a digital receiver for receiving streaming digital information, the digital receiver being effective to:
      receive a first packet of streaming digital content corresponding to a first time interval of the streaming digital content, wherein the first packet includes a first plurality of content units;
      store the first packet in a play buffer;
      receive a second packet of streaming digital content corresponding to a second time interval of the streaming digital content, wherein the second packet includes a second plurality of content units, and wherein one or more of the second content units are the same as one or more of the first content units, and wherein one or more of the second content units are not the same as any of the first content units;
      store one or more of the second content units in the play buffer;
      sequentially read the content units stored in the play buffer; and
      play the sequentially read content units on a media output device.

9. The information handling system of claim 8 wherein the digital receiver stores the one or more second content units in the play buffer by overlaying one or more of the first content units that are the same as one or more of the second content units.

10. The information handling system of claim 8 wherein the digital receiver stores the one or more second content units in the play buffer by selecting the second content units that are not the same as any of the first content units, and storing the selected second content units in the play buffer.

11. The information handling system of claim 10 wherein the digital receiver stores the selected second content units in the play buffer by storing the selected second content units in a position after the first packet stored in the play buffer.

12. The information handling system of claim 8 wherein the digital receiver is further effective to:
   receive a third packet of streaming digital content corresponding to a third time interval of the streaming digital content, wherein the third packet includes a third plurality of content units, and wherein one or more of the third content units are the same as one or more of the second content units, and wherein one or more of the third content units are not the same as any of the second content units; and
   store one or more of the third content units in the play buffer.

13. The information handling system of claim 8 wherein the digital receiver is further effective to:
   encounter an obstruction, after receiving the first packet, that prevents reception of one or more subsequent packets;

receive the second packet after encountering the obstruction; and play the sequentially read content units on the media output device without an interruption.

14. A computer readable medium having encoded thereon computer instructions for execution by a computer, which, when executed by the computer, cause the computer to implement a method for receiving streaming digital information at a moving receiver, said method comprising:

receiving a first packet of streaming digital content corresponding to a first time interval of the streaming digital content, wherein the first packet includes a first plurality of content units;

storing the first packet in a play buffer;

receiving a second packet of streaming digital content corresponding to a second time interval of the streaming digital content, wherein the second packet includes a second plurality of content units, and wherein one or more of the second content units are the same as one or more of the first content units, and wherein one or more of the second content units are not the same as any of the first content units;

storing one or more of the second content units in the play buffer;

sequentially reading the content units stored in the play buffer; and playing the sequentially read content units on a media output device.

15. The computer readable medium of claim 14 wherein storing the one or more second content units in the play buffer further comprises:

overlaying one or more of the first content units that are the same as one or more of the second content units.

16. The computer readable medium of claim 14 wherein storing the one or more second content units in the play buffer further comprises:

selecting the second content units that are not the same as any of the first content units; and storing the selected second content units in the play buffer.

17. The computer readable medium of claim 16 wherein storing the selected second content units in the play buffer comprises storing the selected second content units in a position after the first packet stored in the play buffer.

18. The computer readable medium of claim 14 further comprising:

receiving a third packet of streaming digital content corresponding to a third time interval of the streaming digital content, wherein the third packet includes a third plurality of content units, and wherein one or more of the third content units are the same as one or more of the second content units, and wherein one or more of the third content units are not the same as any of the second content units; and storing one or more of the third content units in the play buffer.

19. The computer readable medium of claim 14 further comprising:

after receiving the first packet, encountering an obstruction that prevents reception of one or more subsequent packets; and wherein receiving the second packet occurs after encountering the obstruction, and wherein the playing occurs without an interruption.

20. The computer readable medium of claim 14, wherein the media output device is a digital radio.

* * * * *